United States Patent
Walker et al.

(10) Patent No.: US 7,315,262 B2
(45) Date of Patent: Jan. 1, 2008

(54) CODING AND DECODING METHOD FOR A SEQUENCE OF ELEMENTS, SIGNAL, CODER, DECODER, CORRESPONDING COMPUTER PROGRAMS AND STORAGE MEANS

(75) Inventors: Christopher Paul Hulme Walker, Milton Keynes (GB); Arnaud Closset, Cesson-Sévigné (FR); Laurent Frouin, Rennes (FR); Sylvain Buriau, Rennes (FR); Barry Michael Cook, Market Drayton (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/179,620

(22) Filed: Jul. 13, 2005

(65) Prior Publication Data

US 2006/0038707 A1    Feb. 23, 2006

(30) Foreign Application Priority Data

Jul. 22, 2004    (FR)    ................... 04 08143

(51) Int. Cl.
*H03M 5/00*    (2006.01)
(52) U.S. Cl. .......................................... 341/58; 341/50
(58) Field of Classification Search ............. 341/50–90
See application file for complete search history.

(56) References Cited

U.S. PATENT DOCUMENTS

| 4,486,739 A | 12/1984 | Franaszek et al. ........ 340/347 |
| 6,334,201 B1* | 12/2001 | Sawaguchi et al. ........ 714/795 |
| 6,339,659 B1* | 1/2002 | Fukuhara et al. ........... 382/249 |
| 2006/0028361 A1 | 2/2006 | Piret et al. ..................... 341/50 |

FOREIGN PATENT DOCUMENTS

GB    1 200 680 A    7/1970

OTHER PUBLICATIONS

A.X. Widmark et al., "A DC-Balanced, Partitioned-Block, 8B/10B Transmission Code", IBM Journal of Research and Development, vol. 27, No. 5, pp. 440-451, Sep. 1983.

* cited by examiner

*Primary Examiner*—Lam T. Mai
(74) *Attorney, Agent, or Firm*—Fitzpatrick, Cella, Harper & Scinto

(57) ABSTRACT

A coding method for a sequence of elements that can be equal to at least two distinct values, the elements forming at least one input symbol. The coding method comprises a stretching step of stretching at least one of the input symbols, to form a stretched symbol, such that the stretched symbol does not have any successive transitions. The coding method further comprises a cancelling step of canceling the disparity of the stretched symbol to form a coded symbol, such that the coded symbol comprises approximately the same number of elements of each value.

24 Claims, 8 Drawing Sheets

| | 71 | 72 | 73 | 74 | 75 |
|---|---|---|---|---|---|
| 0 | -------- | -------- | --------++++++++ | | 18 bits |
| 1 | +------- | ++------- | ++-------+++++ | | 16 bits |
| 2 | -+------ | -++------ | -++-------+++++++ | | 18 bits |
| 3 | ++------ | +++------ | +++-------++++ | | 14 bits |
| 4 | --+----- | ---++----- | ---++----+++++++ | | 18 bits |
| 5 | +-+----- | ++-++----- | ++-++-----++++ | | 16 bits |
| 6 | -++----- | -+++----- | -+++-----+++++ | | 16 bits |
| 7 | +++----- | ++++----- | ++++------++ | | 12 bits |
| 8 | ---+---- | ----++---- | ----++-----+++++++ | | 18 bits |
| 9 | +--+---- | ++--++---- | ++---++----++++ | | 16 bits |
| 10 | -+-+---- | --++-++---- | -++-++----+++++ | | 18 bits |
| 11 | ++-+---- /76 | +++--++---- /77 | +++-++----++ /78 | | 14 bits |
| 12 | --++---- | ---+++---- | ---+++----+++++ | | 16 bits |
| 13 | +-++---- | ++--+++---- | ++--+++----++ | | 14 bits |
| 14 | -+++---- | --++++---- | --++++-----+++ | | 14 bits |
| 15 | ++++---- | +++++---- | +++++----- | | 10 bits |
| 16 | ----+--- | -----++--- | -----++---+++++++ | | 18 bits |
| 17 | +---+--- | ++----++--- | ++----++---++++ | | 16 bits |
| 18 | -+--+--- | --++---++--- | --++--++----+++++ | | 18 bits |
| 19 | ++--+--- | +++---++--- | +++---++----++ | | 14 bits |
| 20 | --+-+--- | ---++-+--- | ---++-++----+++++ | | 18 bits |
| 21 | +-+-+--- | ++-++-++--- | ++-++-++---++ | | 16 bits |
| 22 | -++-+--- | -+++--++--- | -+++--++----+++ | | 16 bits |
| 23 | +++-+--- | ++++--++--- | ++++--++---- | | 12 bits |
| 24 | ---++--- | ----+++--- | ----+++----+++++ | | 16 bits |
| 25 | +--++--- | ++---+++--- | ++---+++----++ | | 14 bits |
| 26 | -+-++--- | --++--+++--- | -++--+++----+++ | | 16 bits |
| 27 | ++-++--- | +++--+++--- | +++--+++---- | | 12 bits |
| 28 | --+++--- | ---++++--- | ---++++----+++ | | 14 bits |
| 29 | +-+++--- | ++--++++--- | ++--++++---- | | 12 bits |
| 30 | -++++--- | --+++++---- | --+++++-----++ | | 14 bits |

| 254 | -+++++++ | --++++++++ | --++++++++------ | 16 bits |
|---|---|---|---|---|
| 255 | ++++++++ | ++++++++++ | ++++++++++-------- | 18 bits |

Figure 7

CODING AND DECODING METHOD FOR A SEQUENCE OF ELEMENTS, SIGNAL, CODER, DECODER, CORRESPONDING COMPUTER PROGRAMS AND STORAGE MEANS

BACKGROUND OF THE INVENTION

1. Field of the Invention

This invention relates to the field of telecommunications. More precisely, the invention proposes a new coding and decoding method for a high-speed data transmission, particularly in a home or office environment.

2. Description of Prior Art

Some constraints have to be respected during the data sending and transmission phase for data transmission applications in interior and exterior environments, particularly limiting the radiation spectrum. These constraints are applicable particularly to transmissions in a home or office environment. Thus, according to electromagnetic compatibility standards in force, the radiation spectrum must respect a jig limiting radiation beyond 30 MHz. Some coding methods are used for data transmission in an intra-building environment, particularly in order to limit radiation beyond 30 MHz, while maintaining a high speed.

Thus a first coding system, MLT3 (MulTiLevel 3) coding system more particularly described in detail in standard IEEE802 3, is used for example in 100BaseT type interfaces. In this coding system, bits equal to "1" correspond to a transition, while bits equal to "0" correspond to a lack of transition. Thus, only bits equal to "1" will cause a change in the state signal. They are coded successively on 3 states, for example such as −V, 0, +V. Bits equal to "0" are coded using the previously transmitted value.

The main advantage of the MLT3 coding system is that it significantly reduces the frequency necessary for a given speed, due to the use of three states. For example, for a speed of about 100 Mbits/s, the maximum parasite frequency of the signal is about 25 MHz.

One major disadvantage of this coding system is due to the long sequences of bits equal to "0" that appear in this code and that can cause a loss or phase shift of the receiver clock. Coded data are scrambled before being transmitted to overcome this problem, which reduces the improvements provided by this code.

Moreover, the Hamming distance between valid code words is very small (equal to one), which facilitates transmission errors that might occur in coding or in scrambling. There is then a risk of accepting invalid code words or rejecting valid code words.

Finally, with this code it is difficult to control the radiation spectrum and it does not have particularly interesting error detection or correction properties.

Other coding methods used to obtain a radiation spectrum partly respecting the limitation of radiation beyond 30 MHz are also envisaged according to prior art.

These coding methods are capable of cancelling the DC component of data to be transmitted on average or for each symbol transmitted.

Cancellation of this DC component (DC balancing for direct component balancing), provides a means of obtaining a radiation spectrum partly respecting a jig imposed by intra-building transmission standards, limiting radiation beyond 30 MHz.

For example, one such method uses the Widmer and Franaszek coding (A. X. Widmer and P. A Franaszek, IBM Journal of Research and Development, Vol. 27 No. 5, p. 440, September 1983), used in the IEEE 1394b standard. This coding can result in 10-bit words starting from 8 bit words, using a DC balancing technique.

This technique cancels the average DC component, and not the DC component for each transmitted symbol.

However, it has the disadvantage that it enables successive transitions. The result is non-negligible radiation beyond 30 MHz. The spectrum then does not fully respect the jig specified in frequency emission standards. Therefore this code only partly satisfies the specified constraints.

SUMMARY OF THE INVENTION

The invention with its various aspects is intended particularly to overcome these disadvantages of prior art.

More precisely, one purpose of the invention is to supply a coding method for data transmission so that a signal can be transmitted while limiting radiation during sending.

In particular, in the case of a wire transmission, one purpose of the invention is to provide such a method to limit radiation and attenuations in transmission wires, and more particularly in cables.

Another purpose of the invention is to provide such a coding method that enables high-speed data transmissions.

Another purpose of the invention is to propose a method that is easy to implement in sending and in reception, with a low cost.

These purposes, and others that will appear later, are achieved using a coding method for a sequence of elements that can be equal to at least two distinct values, the said elements forming at least one input symbol.

According to the invention, this type of coding method uses:

- a stretching step to stretch at least one of the input symbols, to form a stretched symbol, such that the stretched symbol does not have any successive transitions;
- a cancelling step to cancel the disparity of the stretched symbol to form a coded symbol, such that the coded symbol comprises approximately the same number of elements of each value.

According to the invention, it is considered that each element to be transmitted may be equal at least to two distinct values, for example such as "0" and "1" for an element of the bit type, or "−V" and "+V", where V is a positive voltage.

Elements of the transmission are grouped in symbols, called input symbols, which in one preferred embodiment of the invention are bytes.

The first step consists of stretching at least one input symbol, which means that each isolated element of a symbol is extended by at least one additional element of the same value to form a stretched symbol, which does not include any isolated elements.

The second step then includes cancellation of the disparity of the stretched symbol, carried out by adding balancing elements if necessary (for example bits) so as to obtain approximately the same number of elements of each value in a coded symbol, thus cancelling the DC component on average.

Therefore this type of coding method can transmit data while respecting frequency emission standards, the DC component of the sent coded sequence being approximately balanced and the coded sequence not having any successive transitions during the transmission, in other words not having two transitions separated by a single element.

Advantageously, the coded symbol contains exactly the same number of elements of each value.

During the cancelling step to cancel the disparity of the stretched symbol, the coder adds exactly the number of balancing elements necessary to obtain exactly the same number of elements of each value in a coded symbol, in other words a coded symbol disparity equal to "0".

Preferably, the stretching step is done by extending each group of consecutive elements with the same value by an additional element with the same value.

Thus, all groups of consecutive elements with the same value of an input symbol are stretched, the stretching step not being limited to isolated elements only.

This technique simplifies the associated decoding method, since the decoder knows in advance that all groups of consecutive elements with the same value have been stretched during coding.

Advantageously, the cancelling step to cancel the disparity of the stretched symbol includes the following steps:
  calculation of the disparity of the stretched symbol;
  addition of balancing elements such that the disparity is cancelled in the corresponding coded symbol.

The cancelling step is thus carried out in two steps. Firstly, the coder calculates the disparity within a stretched symbol, for example by analysing the number of elements with each of the values, and then taking their difference.

The coder then adds balancing elements in the stretched symbol to give a coded symbol until the coded symbol contains the same number of elements of each value.

According to one advantageous embodiment, the stretched symbol comprises elements with a first value and elements with a second value, and the cancelling step to cancel the disparity of the stretched symbol uses an intermediate step to stretch the last element of the stretched symbol when the number of the elements of a first value is more than the number of the elements of a second value by one unit, and when the last element of the stretched symbol is of a first value.

Thus, in the special case in which the absolute value of the disparity is equal to 1, in other words when the number of elements of a first value is more than the number of elements of a second value by one unit, and when the last element of the stretched symbol is equal to a first value, the coder duplicates the last element of the stretched symbol before adding balancing elements, so as to avoid an isolated transition.

Thus, if the elements are bits that can be equal to a first value equal to "1" and a second value equal to "0", and if it is considered that the value of the disparity is equal to 1, with the number of bits equal to "1" in the stretched symbol exceeding the number of bits equal to "0" by one unit, then if the last bit of the coded symbol is "1", this last bit is stretched by adding a "1". On the other hand, if the last bit of the coded symbol is equal to "0", under the same conditions as above, this last bit will not be stretched.

For example, if the input byte "11000101" is considered, the stretched byte after the data have been stretched is "1110000110011". The coder easily evaluates the disparity which is equal to +1. The stretched byte actually comprises seven bits equal to "1" and six bits equal to "0".

In systems according to prior art, a single balancing bit equal to "0" is added. The coded byte is then "1100001100110". This byte actually has a balanced DC component, but if the next coded byte transmitted begins with a "1", there will be an isolated transition in the transmitted data between the two coded symbols.

According to the invention, the last element of the stretched byte is duplicated before balancing bits are added. The coded byte, which then never contains two successive transitions and for which the DC component is zero, becomes "1110000110011100".

Preferably, the stretching step is implemented for each of the input symbols.

The coding method is then applicable to all input symbols, so as to facilitate decoding in reception.

According to one variant embodiment, the stretching step of the input symbol takes account of the value of a last element of the previous coded symbol so as to avoid two successive transitions.

Thus, for example, the coder memorises the value of the last calculated element before going on to the next symbol, so as to avoid the last calculated element being an isolated element.

Advantageously, the coding method comprises a scrambling step for scrambling the element prior to the stretching step.

This data scrambling step provides a means of converting the data flow into a pseudo-random flow, so as to limit the pass-band and increase the resistance to transmission parasites. In particular, this step contributes to limiting high frequencies in the signal spectrum, particularly if the same symbol is transmitted several times consecutively.

Advantageously, the transmission used is a serial transmission.

The coding method is also remarkable in that it includes a step in which a synchronisation sequence is added to at least one of the coded symbols.

Thus, the synchronisation sequence can be transmitted only every N input symbols, where N is an integer equal to or greater than 1, or when a desynchronisation phenomenon appears at the decoder (for example no acknowledgement).

The transmission can be made on one or several cables in parallel, which can increase the useful throughput.

In particular, the transmission can be made on at least one CAT-5 UTP type cable.

CAT-5 UTP "Category 5 Unshielded Twisted Pair) type cables are twisted pairs according to the ANSI/TIA/EIA/568A standard.

The invention also relates to a coding method for transmission of a sequence of input data, the sequence of input data being composed of elements that can be equal to at least two distinct values. According to the invention, this type of coding method uses:
  a stretching step to stretch the sequence of input data to form a stretched sequence, such that at least part of the stretched sequence does not have successive transitions;
  a cancelling step to cancel the disparity of the stretched sequence, to form a coded sequence such that the coded sequence includes approximately the same number of elements of each value.

Thus, the transmitted sequence does not have successive transitions, in other words it does not have two transitions separated by a single element, and it has an approximately balanced DC component.

The invention also relates to a method for decoding a sequence of elements that can be equal to at least two distinct values, the elements forming at least one coded symbol, the coded symbol not having any successive transitions and having approximately the same number of elements of each value.

According to the invention, this type of method includes the following for each of the coded symbols:
- a destretching step to destretch the coded symbol, to form a destretched symbol;
- a analyzing step to analyze the disparity of the destretched symbol, to form a decoded symbol.

This decoding method can thus decode a symbol with a balanced DC component, without any isolated elements, in other words elements with a first value surrounded by two elements with different values.

Preferably, since the coded symbol includes a first set of stretched elements, the destretching step uses the following for the first set of coded elements:
- a step to delete a new received element when the previous element has a value different from the value of the new received element;
- a step to memorise a new received element, when the previous element has a value identical to the value of the new received element;
- a step to update the disparity, that depends on deleted and memorised elements.

This first set of stretched elements actually corresponds to the stretched symbol obtained after the stretching step in the coding method. Therefore, the destretching step in the decoding method is generally applicable to elements corresponding to a stretched symbol in the coding method.

Advantageously, the coded symbol also comprises a second set of balancing elements, and the disparity analizing step uses:
- a step to analyze the value of the updated disparity;
- a step to process the second set of balancing elements, when the value of the updated disparity is not equal to zero.

This second set of balancing elements actually corresponds to elements added during the disparity cancellation step in the coding method. Therefore, the disparity analysis step in the decoding method generally applies to balancing elements.

Thus, by analysing the disparity, this decoding method provides a means of detecting transmission errors. Thus, when a transmission error is detected, it can ask an emitter to transmit the lost data once again.

This decoding method is remarkable particularly in that the step for processing of the second set of balancing elements uses the following, when the absolute value of the updated disparity is equal to one:
- a step to update the disparity and to delete a new received element when the value of the previous element is identical to the value of the new element;
- a step to notify a transmission error and delete a new received element when the value of the previous element is different from the value of the new element.

Once again, this decoding method provides a means of detecting transmission errors, by considering the destretched symbol and the balancing elements.

In particular, the decoding method comprises a step to take account of the value of the last element of the previous decoded symbol.

Advantageously, it comprises an inverse scrambling step (descrambling step) of the elements of the decoded symbols.

The decoding method is also remarkable in that it includes a step to recover a synchronisation sequence between at least two of the coded symbols.

The advantages of the systems, devices, computer program product and computer readable storage medium are the same as the advantages of the coding and decoding methods. Consequently, they are not described in more detail.

BRIEF DESCRIPTION OF THE DRAWINGS

Other characteristics and advantages of the invention will become clearer after reading the following description of a preferred embodiment, given as a simple illustrative and non-limitative example, and the appended drawings, wherein:

FIG. 7 shows the correspondence (alphabet) between coded symbols and decoded symbols using the coding and decoding algorithms in FIGS. 3A and 4A.

MORE DETAILED DESCRIPTION

The general principle of the invention is based on the addition of a data stretching step before an operation to cancel the disparity at each symbol so as to transmit a signal for which the DC component is zero for each transmitted coded symbol, and which never has two successive transitions during the transmission.

Advantageously, these data stretching and disparity cancellation operations are preceded by a data scrambling step.

The remainder of this description presents a preferred embodiment of the invention in which the symbols are bytes and the elements are bits.

Figure 1:
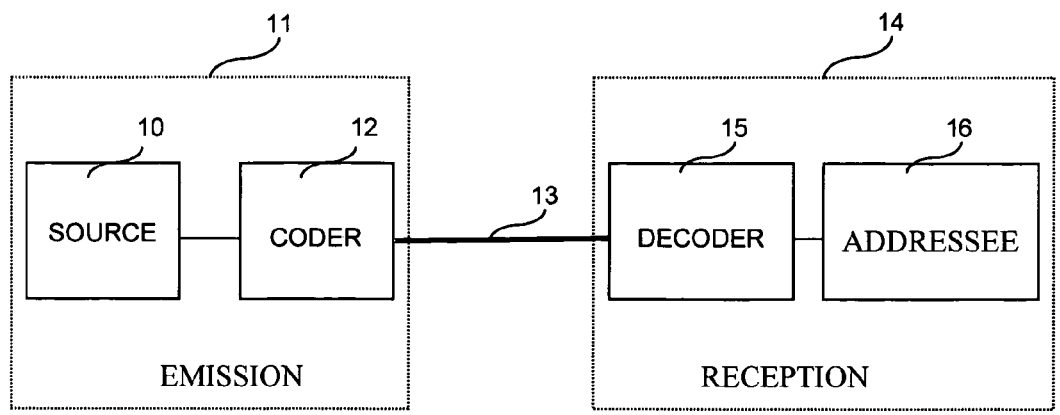
FIG. 1 shows the general principle of a coding system in sending and a decoding system in reception according to the invention.

FIG. 1 shows the general principle of a coding/decoding system according to the invention.

A coder 12 is added to a sending block 11 at the output from a source block 10, so as to transmit data from the sending block 11 to a reception block 14, while respecting parasite frequency emission standards.

Data to be transmitted originating from the source block 10 comprise elements that can be equal to two distinct values, for example such as bits, grouped in symbols.

This coder 12 codes data so as to transmit a signal for which the DC component is zero for each transmitted symbol, and which never has two successive transitions during the transmission.

Figure 3A:
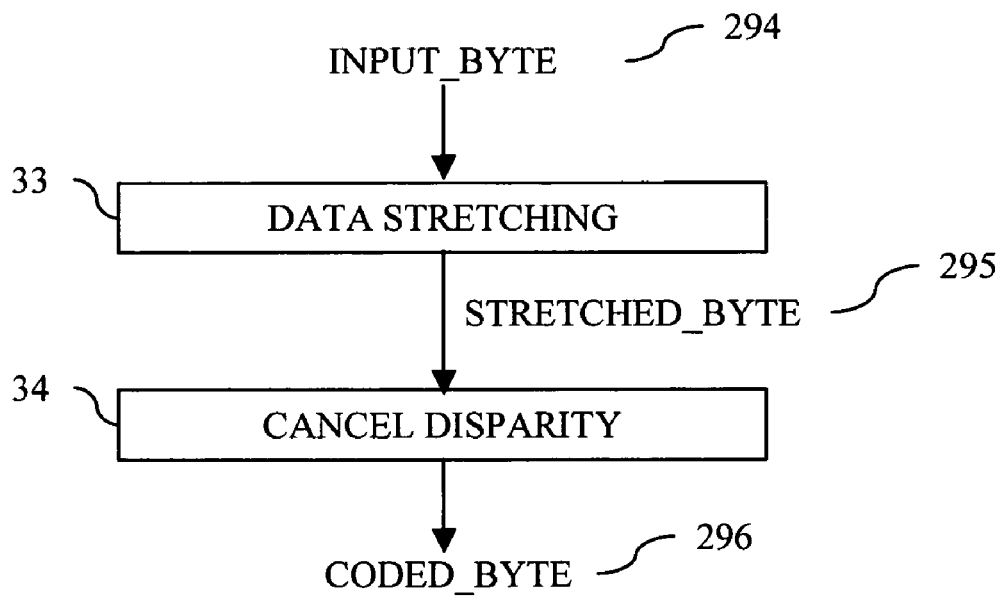
FIGS. 3A and 3B diagrammatically show a coding algorithm according to the invention, used in the coder in FIG. 1.

The coding steps used in the coder 12 are described in more detail in the coding algorithm presented in FIG. 3A.

Coded data are then transmitted to the reception block 14 using CAT-5 UPT (Category 5 Unshielded Twisted Pair) type cables 13, according to standard ANSI/TIA/EIA/568A.

This type of cable is conventionally used in Ethernet type networks and is particularly well suited for the invention.

Other wire transmission media are used in variants of the invention.

The reception block 14 then receives coded data sent by the sending block 11. These data are decoded by means of the decoder 15 in the reception block 14 by performing inverse coding steps, and are then transmitted to an addressee 16.

Figure 4A:
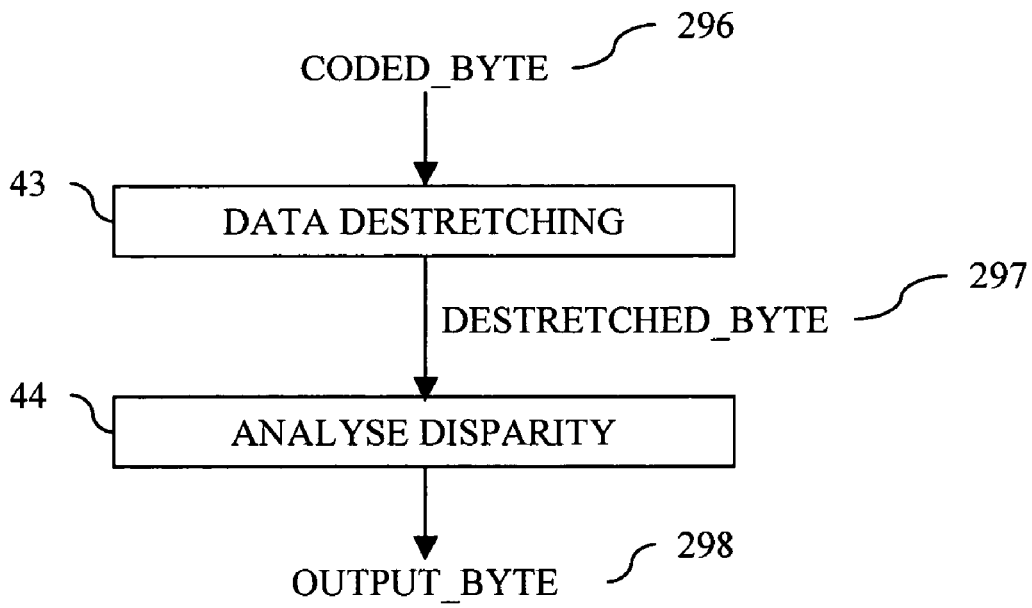
FIGS. 4A and 4B illustrate a decoding algorithm for a signal coded using the coding algorithm in FIGS. 3A and 3B, and used in the decoder in FIG. 1.

The decoding steps used in the decoder 15 are described in more detail in the decoding algorithm presented in FIG. 4A.

Figure 2A:
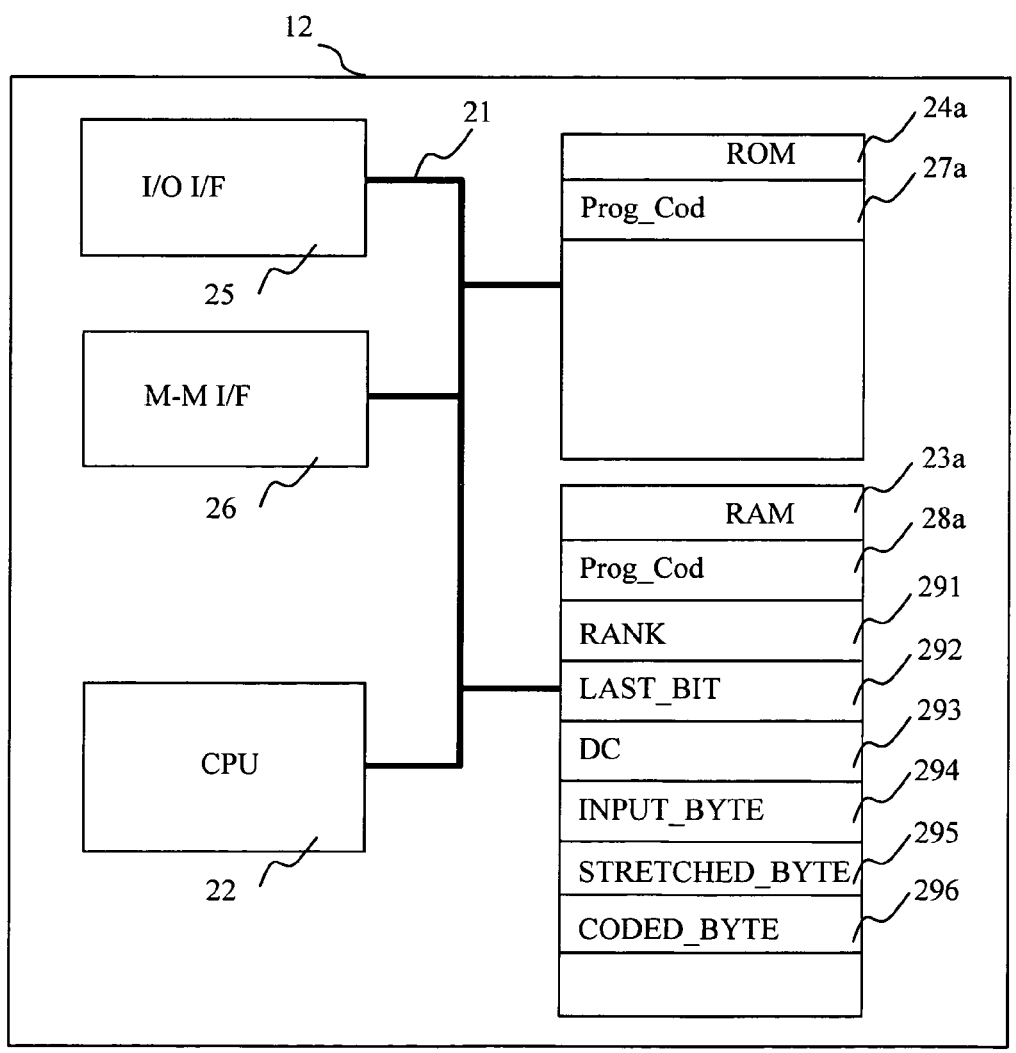
FIGS. 2A and 2B illustrate a device forming a coder and a device forming a decoder respectively, forming part of the system presented in FIG. 1.

FIG. 2A diagrammatically illustrates a device corresponding to the coder 12 as illustrated with reference to FIG. 1.

The coder 12 includes the following, connected to each other through an address and data bus 21:
- a processor 22;
- RAM 23a;
- non-volatile memory 24a;
- an input/output interface 25; and
- a man/machine interface 26.

Each of the elements illustrated in FIG. 2A is well known to those skilled in the art. These common elements are not described herein.

It should be noted that in the description below for each of the memories mentioned, the word "register" used in the entire description may equally well denote a small capacity memory area (a few binary data), or a large capacity memory area (capable of storing an entire program or an entire sequence of transaction data).

The non-volatile memory 24a keeps the operating program for the processor 22 in a "prog_cod" register 27a, in registers that are called the same name as the data that they contain for convenience.

Figure 3B:
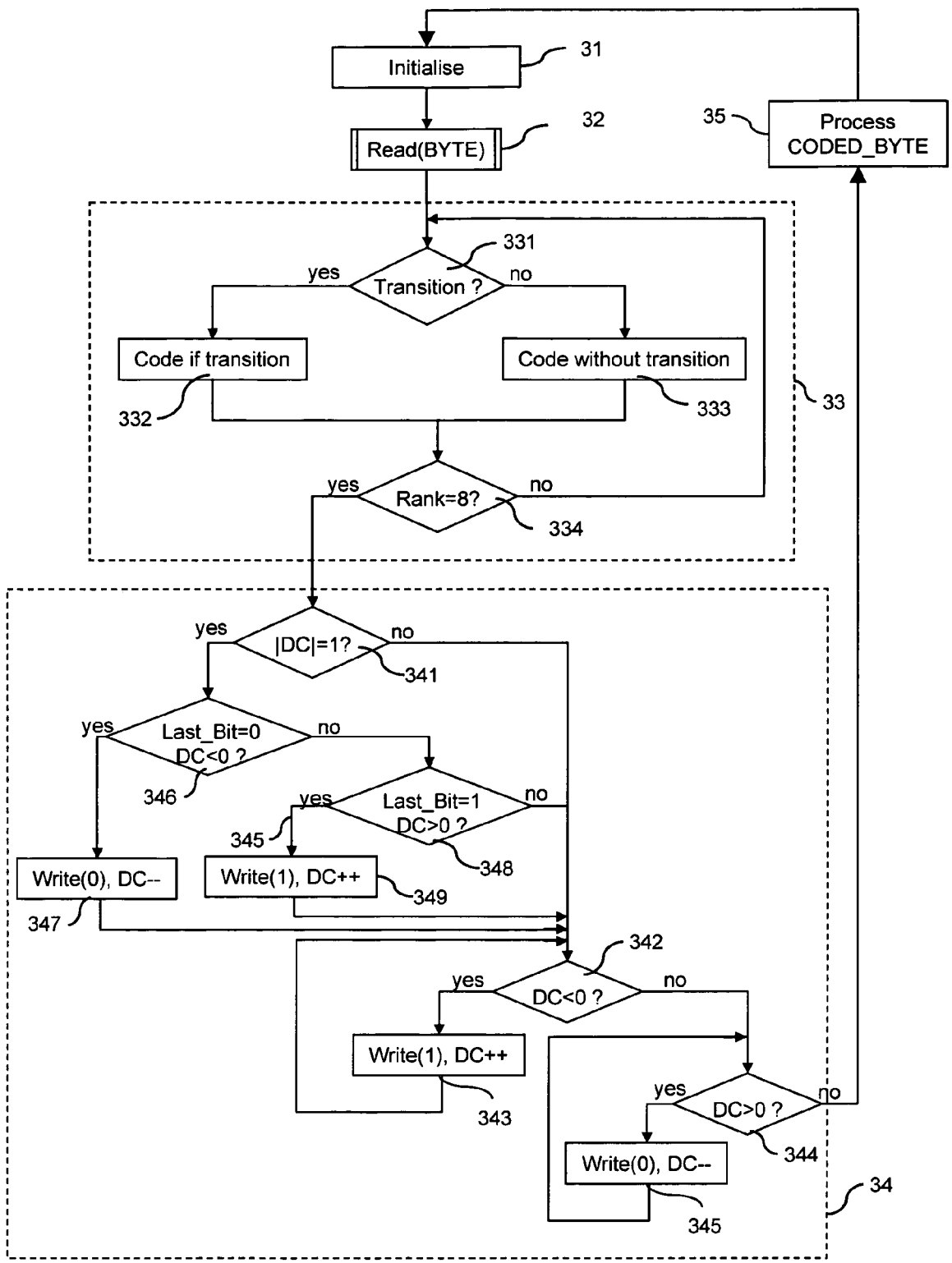
Figure 4B:
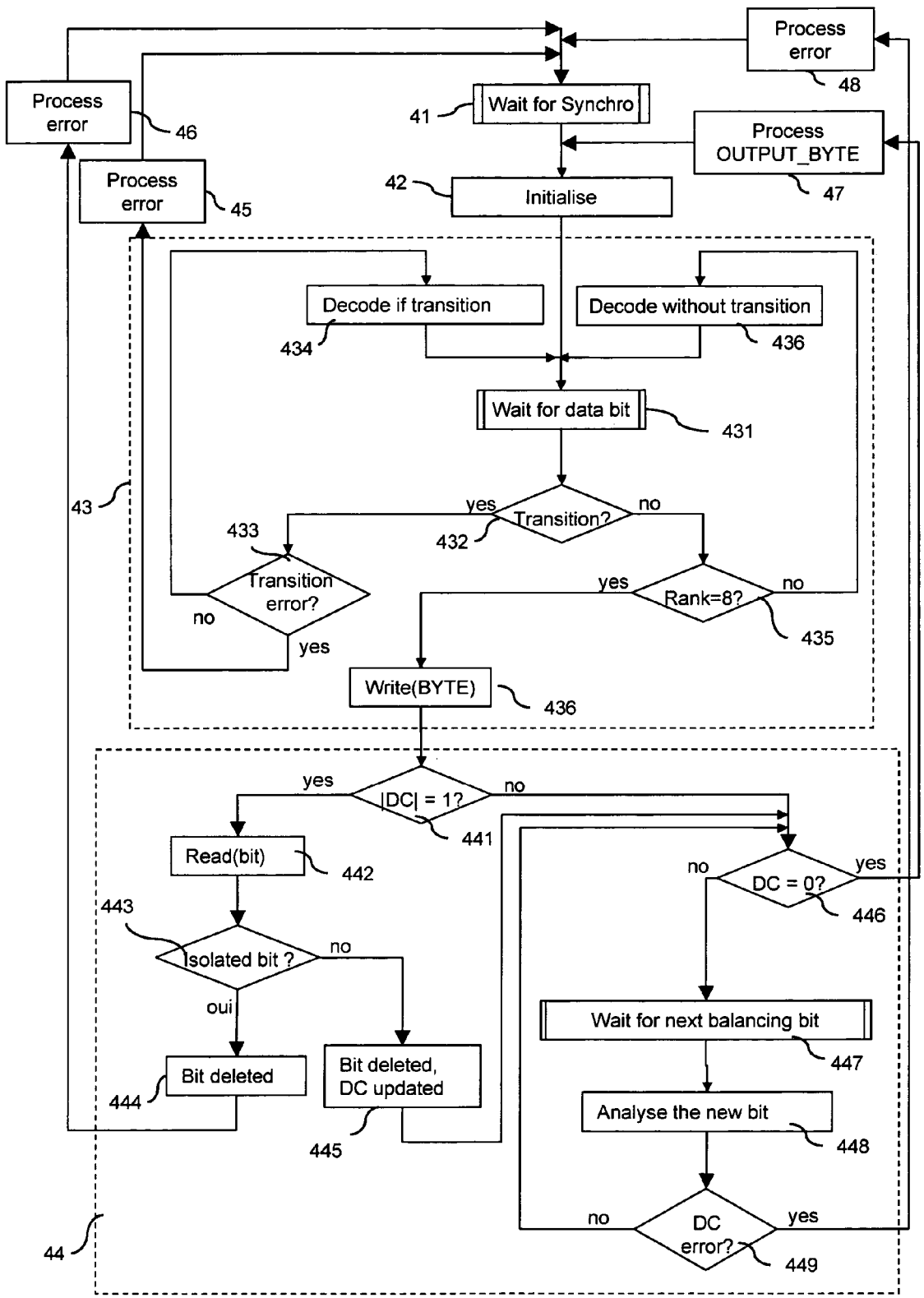

The algorithms that implement the steps of the methods described below, particularly with reference to FIGS. 3B and 4B, are stored in non-volatile memory 24a associated with the coder 12, and 24b associated with the decoder 15 implementing the steps according to these algorithms.

On power up, the processor 22 loads and executes the instructions of these algorithms.

The RAM 23a keeps data, variables and intermediate processing results and in particular includes:
- the "prog_cod" operating program 28a for the processor 22 that switches the coder 12 on;
- program operating variables 28:
  - RANK in a register 291;
  - LAST_BIT in a register 292;
  - DC in a register 293;
  - INPUT_BYTE in a register 294;
  - STRETCHED_BYTE in a register 295; and
  - CODED_BYTE in a register 296.

Figure 2B:
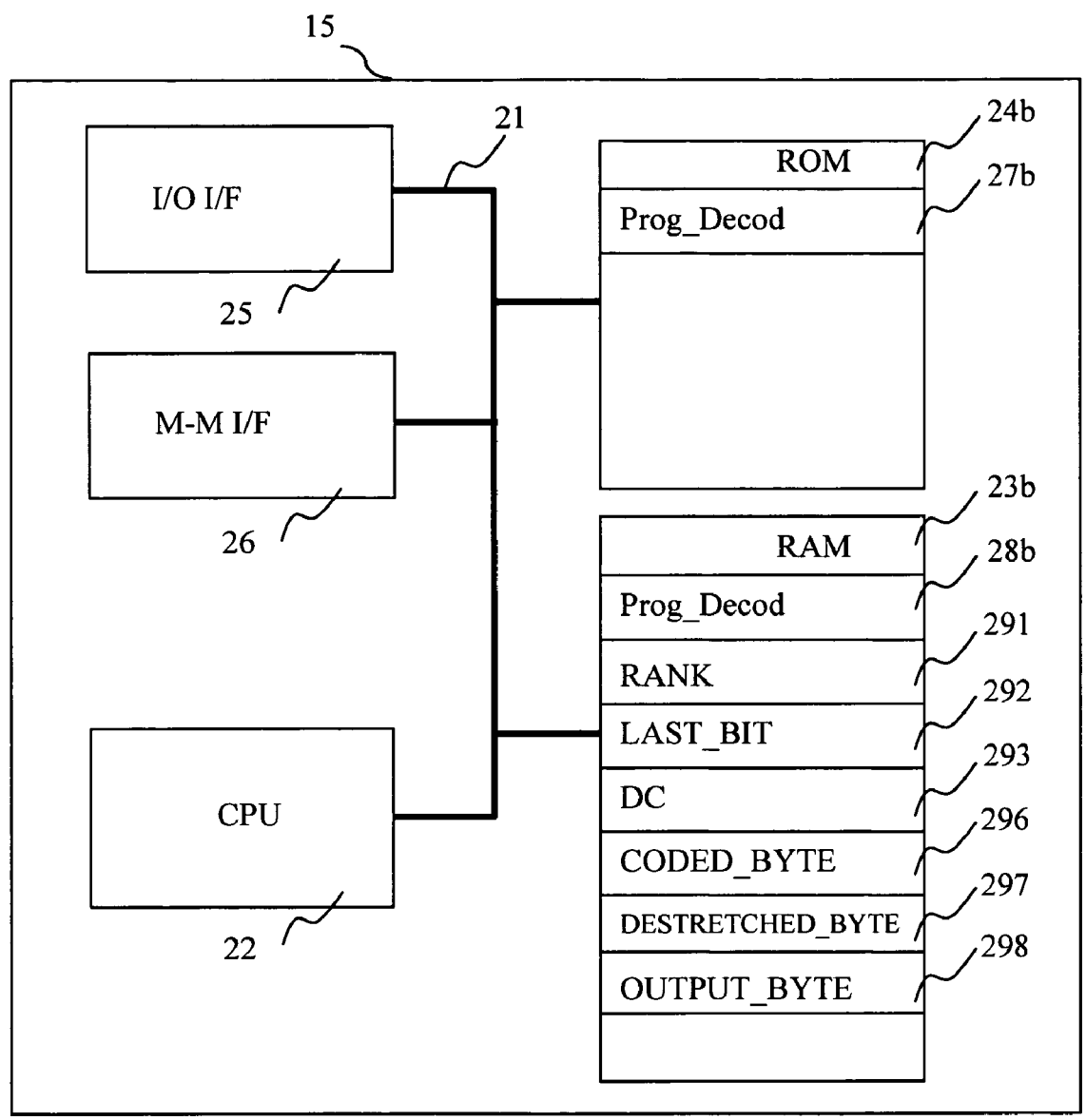

FIG. 2B diagrammatically illustrates a device corresponding to the decoder 15 as illustrated with reference to FIG. 1.

As for the coder 12, the decoder 15 includes the following, connected to each other through an address and data bus 21:
- a processor 22;
- RAM 23b;
- non-volatile memory 24b;
- an input/output interface 25; and
- a man/machine interface 26.

The non-volatile memory 24b keeps the operating program of the processor 22 in a "prog_decod" register 27b.

The algorithms using the steps in the methods described below, particularly with reference to FIGS. 3B and 4B, are stored in the non-volatile memory 24a associated with the coder 12 and 24b associated with the decoder 15 implementing steps according to these algorithms.

On power up, the processor 22 loads and executes the instructions for these algorithms.

The RAM 23b keeps data, variables and intermediate processing results and in particular includes:
- the "prog_decod" operating program 28b for the processor 22 loaded when the decoder 15 was powered up;
- program operating variables 28:
  - RANK in a register 291;
  - LAST_BIT in a register 292;
  - DC in a register 293;
  - CODED_BYTE in a register 296;
  - DESTRETCHED_BYTE in a register 297; and
  - OUTPUT_BYTE in a register 298.

A principle diagram of the coding system is shown with reference to FIG. 3A, using two main steps:
- a stretching step 33 to stretch the data (INPUT_BYTE 294) by adding an element of the same value each time that a group of consecutive elements of the same value occur, avoiding isolated elements and consequently successive transitions; then
- a cancelling step 34 to cancel the disparity of the stretched data (STRETCHED_BYTE 295), calculating the number of elements with the same value in a symbol and adds balancing elements to obtain the same number of elements with each value, in order to cancel the DC component of the signal, in the variable CODED_BYTE 296.

Preferably, a preliminary scrambling step, used to mix the elements, is also added to the coding system.

The stretching operation 33 reduces the fundamental frequency of the code. It also approximately halves the component of the highest frequency of the signal.

FIG. 3B more precisely presents an algorithm showing the coding principle. A first step in the method consists of initialising 31 the different variables 291 to 296:
- the RANK variable 291, that corresponds to the position of the last calculated bit, is set to zero;
- the LAST_BIT variable 292, that represents the value of the last calculated bit, contains the indeterminate value X (therefore it does not contain the value "0" or the value "1");
- and the DC variable 293 that corresponds to the value of the disparity, or the difference between the number of bits equal to "1" and the number of bits equal to "0", is set equal to zero.

During a read step 32, the coder 12 waits and then receives a byte to be coded at its input, sent by the source 10. This input byte is read and stored in the INPUT_BYTE register 294 before being coded.

The content of the input element INPUT_BYTE 294 is then analyzed and processed in the stretching step 33. Each bit forming part of the byte stored in this register 294 is then analyzed, beginning with the Least Significant Bit (LSB).

Step 33 begins with a transition detection test 331 during which the coder 12 checks if there is an edge (a transition) between the analyzed bit of the variable INPUT_BYTE 294 and the bit stored in the LAST_BIT variable 292.

If the RANK variable 291 is equal to 0 and the LAST_BIT variable 292 is equal to X, the value of the bit at the location INPUT_BYTE (RANK) is not defined. Therefore, it is considered that there is a transition that is detected during the transition detection test 331. If a transition is detected, the value of the analyzed bit of the INPUT_BYTE variable 294 is stored in the LAST_BIT register 292 (LAST_BIT=INPUT_BYTE(RANK)) during a "coding if transition detection" operation 332. The STRETCHED_BYTE variable 295 is updated by adding the value of the analyzed bit twice. The value of the rank stored in the RANK register 291 is then incremented by one unit and the value of the disparity stored in the DC register 293 is updated.

If the transition detection test 331 does not detect a transition during a "coding without transition" operation 333, the value of the analyzed bit of the INPUT_BYTE variable 294 is stored in the LAST_BIT register 292 (LAST_BIT=INPUT_BYTE (RANK)). The STRETCHED_BYTE variable 295 is updated by adding the value of the analyzed bit once only. The value of the rank stored in the RANK register 291 is then incremented by one unit and the value of the disparity stored in the DC register 293 is updated.

The coder 12 analyzes the value of the RANK variable 291 during a test 334, after either the "coding if transition detection" operation 332 and "coding without transition" operation 333. If this value is less than 8, then it did not code an entire byte, and it repeats the test 331 to detect an edge.

Thus, by studying the different transitions in the INPUT_BYTE variable 294 during the stretching step 33, the coder 12 stretches the data contained in this variable. This means that each group of consecutive bits equal to "0" or "1" will be extended by a bit with the same value.

When the value of RANK 291 is equal to 8 (test 334), the coder 12 performs the disparity cancellation step 34. This cancelling step 34 begins with a test 341 that determines if the absolute value of the disparity is equal to 1, the coder 12 processing this case separately.

If the disparity is not equal to +1 or −1, the sign of this disparity is analyzed during a test 342.

If the sign is negative, a balancing bit equal to "1" is added to the STRETCHED_BYTE variable 295 during a step 343, the value of the DC variable 293 is incremented by one unit, and the coder 12 reiterates the disparity sign analysis operation in test 342.

Otherwise, the sign of the disparity is analyzed once again during a test 344:
  if it is positive, a balancing bit equal to "0" is added to the STRETCHED_BYTE variable 295 during an operation 345, the value of the DC variable 293 is decremented by one unit, and coder 12 reiterates the operation to analyze the sign of the disparity;
  otherwise, if the sign is zero, the coder 12 memorises the value of the STRETCHED_BYTE variable 295 in the CODED_BYTE register 296. This means that the disparity is zero, and consequently the coder 12 transmits the coded symbol CODED_BYTE 296 to the reception block 14 during a step for processing of the coded byte 35, and then once again processes a new byte after returning to the initialisation step 31.

This operation provides a means of cancelling the DC component of the signal at each symbol, and thus assures a transmission without a DC component.

If the disparity is equal to +1 or −1 during the test 341, the stretched byte may be balanced by adding a single balancing bit into the STRETCHED_BYTE variable 295, but the coder 12 avoids transmitting isolated bits, so as to keep the properties of this coding method. The last calculated bit is then repeated, such that the value of the disparity becomes +2 or −2. This disparity will then be cancelled as described above.

To achieve this, the coder 12 analyzes the value of the last calculated bit stored in the LAST_BIT register 292 and the sign of the disparity DC 293.

If the LAST_BIT 292 is equal to zero, and the sign of the disparity is negative during a test 346, then the last "0" is doubled (extended) in STRETCHED_BYTE 295 and the value of the DC variable 293 is decremented during a step 347.

Otherwise, the coder 12 once again studies the value of the last calculated bit and the sign of the disparity during a step 348. If LAST_BIT 292 is equal to "1" and the sign of the disparity is positive during a step 348, then the last "1" is doubled (extended) in STRETCHED_BYTE 295 and the value of the DC variable 293 is incremented during a step 349.

In other cases, the method explained for the case in which the disparity is not equal to ±1 is repeated.

Finally, the coder 12 repeats these various steps until the value of the DC variable 293 is equal to zero, in other words the STRETCHED_BYTE variable 295 contains the same number of bits equal to "0" as bits equal to "1".

As an illustration, assume for example that the coder 12 receives the INPUT_BYTE='11000101' byte as input and the rightmost bit is the LSB.

The coder 12 firstly performs the stretching step 33. The stretched byte '1110000110011' at the output from this step 33 is memorised in the STRETCHED_BYTE variable 295.

The coder 12 then performs the cancelling step 34. At the output from this step 34, the coded byte '0011110000110011' is memorised in the CODED_BYTE register 296.

It is easy to check that after steps 33 and 34, the CODED_BYTE code word 296 actually has a zero DC component (DC=0) and does not have any isolated bits.

A first variant embodiment of the invention consists of keeping the value of the last calculated bit in memory before going to the next symbol, so as to make sure that this last calculated bit is an isolated bit.

In this case, the value of the LAST_BIT variable 292 is kept in memory during the initialisation phase 31.

A second variant consists of adding bits so as to cancel the DC component (DC=0) at a predetermined number or a dynamically varying number of N stretched symbols, where N is an integer number greater than 1, instead of at each symbol.

A third variant consists of reaching a given predefined value of the disparity before adding balancing bits to cancel the DC component.

Moreover, according to another variant that can be combined with the preferred embodiment or with the variants described above, a synchronisation sequence is advantageously added to the bytes coded in the coder 12 so as to correctly decode data sent in the decoder 15.

This synchronisation sequence is either added to each sequence of N bytes (where N is an integer greater than or equal to 1), or following a loss of synchronisation (for example detection of lack of acknowledgement from the decoder). If this synchronisation sequence is correctly received and is recognised at the decoder, the decoder will no longer need to transmit intermediate synchronisation sequence, for example according to an acknowledgement protocol.

However, if the decoder encounters a synchronisation problem at a symbol K, the coder once again transmits the synchronisation sequence and returns the unrecognised symbols preceding the symbol K (for example symbols K−2 and K−1) with the sequence of symbols to be transmitted.

Finally, those skilled in the art will easily be able to extend this coding method to the case in which the least significant bit is not analyzed first, and particularly to the case in which the first processed bit is the Most Significant Bit (MSB).

FIG. 4A shows a principle diagram for decoding a signal when the DC component of the coded signal is zero and this coded signal does not have any isolated bits.

This decoding algorithm uses two main steps in the decoder 15:
- a destretching step 43 for CODED_BYTE input data 296, which eliminates elements added during coding; then
- an analyzing step for analysis of the disparity 44 of the destretched data or DESTRETCHED_BYTE 297, which checks that the DC component of the received symbols is always zero and thus validates the transmission, in the OUTPUT_BYTE variable 298.

According to one variant, a final step for inverse scrambling (descrambling) of the elements is also used at the decoder.

The data destretching step 43 is actually used to count the number of received bits equal to "1" and the number of received bits equal to "0", and to evaluate the difference between these two numbers, this difference being associated with the disparity.

More precisely, FIG. 4B presents a decoding algorithm for such a signal.

The decoder 15 receives and decodes the sent data, particularly after reception of a synchronisation sequence.

According to the decoding algorithm variant presented below, the decoder 15 receives a first synchronisation sequence at the beginning of reception, then a new synchronisation sequence when a transmission error occurs.

According to other variant embodiments not described in more detail, the decoder 15 also receives a synchronisation sequence before each sequence of N bytes (where N is an integer equal to or greater than 1).

According to the variant presented, the decoder 15 waits for this synchronisation sequence during a waiting for synchronisation operation 41.

As soon as the decoder 15 receives this synchronisation sequence in input, it initialises the different internal variables during an initialisation step 42, and the decoding method starts. In particular, the different values of the variables stored in the registers after the initialisation step 42 are:
RANK=0
LAST_BIT=X;
DC=0.

After the variables initialisation step 42, the decoder 15 performs the data destretching step 43.

It waits for and then receives a first data bit of the coded byte CODED_BYTE 296, during operation 431.

After reception of a bit during operation 431, the decoder 15 performs a transition detection test 432 between the value of this new received bit and the value of the LAST_BIT variable 292.

If an edge is detected, the decoder 15 checks that the transition does not correspond to an isolated bit during a "transition error" test 433. Since the sent code does not include any isolated bits, an isolated bit in reception corresponds to an error in the transmission. The decoder 15 analyzes the transition error and sends an output error message during an error processing step 45. It then waits for new data, particularly a new synchronisation sequence.

However, if the transition detected during the transition detection step 432 does not correspond to an isolated bit, the decoder 15 performs the "decoding if transition" step 434. The value of the new bit received during the "wait for data bit" step 431 is read and then memorised in the LAST_BIT variable 292. The new received bit is then deleted from the CODED_BYTE value 296, and the decoder 15 evaluates the new disparity: if the value of the deleted bit is "1", it increments the value contained in the DC register 293 by 1, otherwise it decrements the value contained in the DC register 293 by 1.

If the transition detection step 432 does not detect a transition, the decoder 15 analyzes the value of the RANK variable 291 during a test 435.

If the RANK variable 291 is strictly less than 8, the decoder 15 reads the value of the new received bit during a "decoding without transition" step 436 and stores it in the LAST_BIT register 292. The value of this received bit is also memorised in a DESTRETCHED_BYTE register 297 at the DESTRETCHED_BYTE (RANK) location. The value of the rank is then incremented and the value of the DC variable 293 updated: if the value of the received bit is equal to "1", the DC variable 293 is incremented by one unit, otherwise the DC variable 293 is decremented by one unit.

If the RANK variable 291 is equal to 0 and the LAST_BIT variable 292 is equal to X, the decoder 15 considers that it has encountered an edge during the transition detection test 432, and that it is not a transition error.

When the value of RANK 291 is equal to 8 (test 435), the decoder 15 writes the value of the variable DESTRETCHED_BYTE 297 into the OUTPUT_BYTE register 298, during a step 436.

The decoder 15 then performs the disparity analysis 44, during which it checks if the received DC component is still zero.

Step 44 begins with a test 441, during which the decoder checks if the absolute value of the disparity is equal to 1.

If it is, the decoder 15 makes sure that the next received bit is not an isolated bit, during an operation to read the next bit 442.

If the value of the next bit is equal to "1" and the last received bit (LAST_BIT 292) is equal to "0" or if the value of the next bit is equal to "0" and the last received bit is equal to "1", a test 443 detects an isolated bit and consequently a transmission error.

The isolated bit is then eliminated in a step 444 and the decoder 15 sends an output error message during an error processing step 46. The decoder 15 then waits for new data, and particularly a synchronisation sequence. However, if the test 443 does not detect an isolated bit, the value of the DC register 293 is updated and the next bit originating from the read operation 442 is deleted during a step 445. In this case, the next bit actually corresponds to a bit added during coding to avoid having an isolated bit during the disparity cancellation step.

If the absolute value of the DC disparity 293 found in the test 441 is not equal to 1, the DC disparity 293 is once again tested during a test 446 to determine if it is equal to 0.

If it is, this means that the received DC component is balanced. Consequently the decoder 15 considers that the received code has actually been decoded. Therefore, it sends an OUTPUT_BYTE variable 298 containing the decoded byte during a step in which the decoded byte 47 is processed, to the addressee 16.

The decoder 15 then waits for new data to be decoded, after initialisation of variables 42.

However, if the disparity is not equal to 0 after the test 441 and during the test 446, the decoder 15 waits for the next bit during a step 447 to analyze whether or not it is a bit that was added in coding to cancel the disparity, in other words if it is a balancing bit.

The value of the new bit input in step 447 is then read during a step 448, and is then stored in the LAST_BIT register 292. The value of DC 293 is updated and this new bit is deleted.

If the value of DC 293 is negative and there are still other bits equal to "0" to be analyzed, or if the value of DC 293 is positive and there are still other bits equal to "1" to be analyzed, the decoder 15 considers that there was an error during the step 449 and sends an output error message during an error processing step 48.

The decoder 15 then waits for a new synchronization sequence.

For example, assuming that the decoder 15 is waiting for data, and that it receives the variable CODED_BYTE='0011110000110011' as input.

The decoder 15 starts by performing the data destretching step 43. At the output from this step 43, the destretched byte '11000101' is stored in the DESTRETCHED_BYTE variable 297.

The sequence that remains to be analyzed, namely the balancing sequence '001' comprises balancing bits added to cancel the disparity avoiding successive transitions. The decoder 15 then performs the analyzing step 44 by studying this balancing sequence. At the output from the step 44, the decoded byte '11000101' is validated and memorized in the OUTPUT_BYTE variable.

A first variant embodiment of the decoding according to the invention consists of keeping the value of the last calculated bit in memory before going onto the next symbol, the coding having been done so as to avoid this last calculated bit from being an isolated bit.

In this case, the value of the LAST_BIT variable 292 is kept in memory during the initialisation step 42.

A second variant consists of adding a step for inverse scrambling of the decoded data, after the destretching and disparity analysis steps, when a data scrambling operation has been done in the coding.

In one particular embodiment, the disparity analysis step may also be eliminated, this step being used essentially for detection of transmission errors.

Finally, those skilled in the art will easily be able to extend this decoding method to the case in which the DC component in the coding is cancelled for a predetermined number N of symbols. Similarly, the order in which bits are processed can be inverted.

However, to enable on the fly processing of data (without storage), the order of the bits in each coded word is inverted before sending to avoid the first bits received at the decoder 15 from being the bits added during the coding phase to cancel the DC component (balancing bits).

Thus, on reception, the destretching step is applied as soon as a first bit is received, and is actually a data bit.

Figure 5:
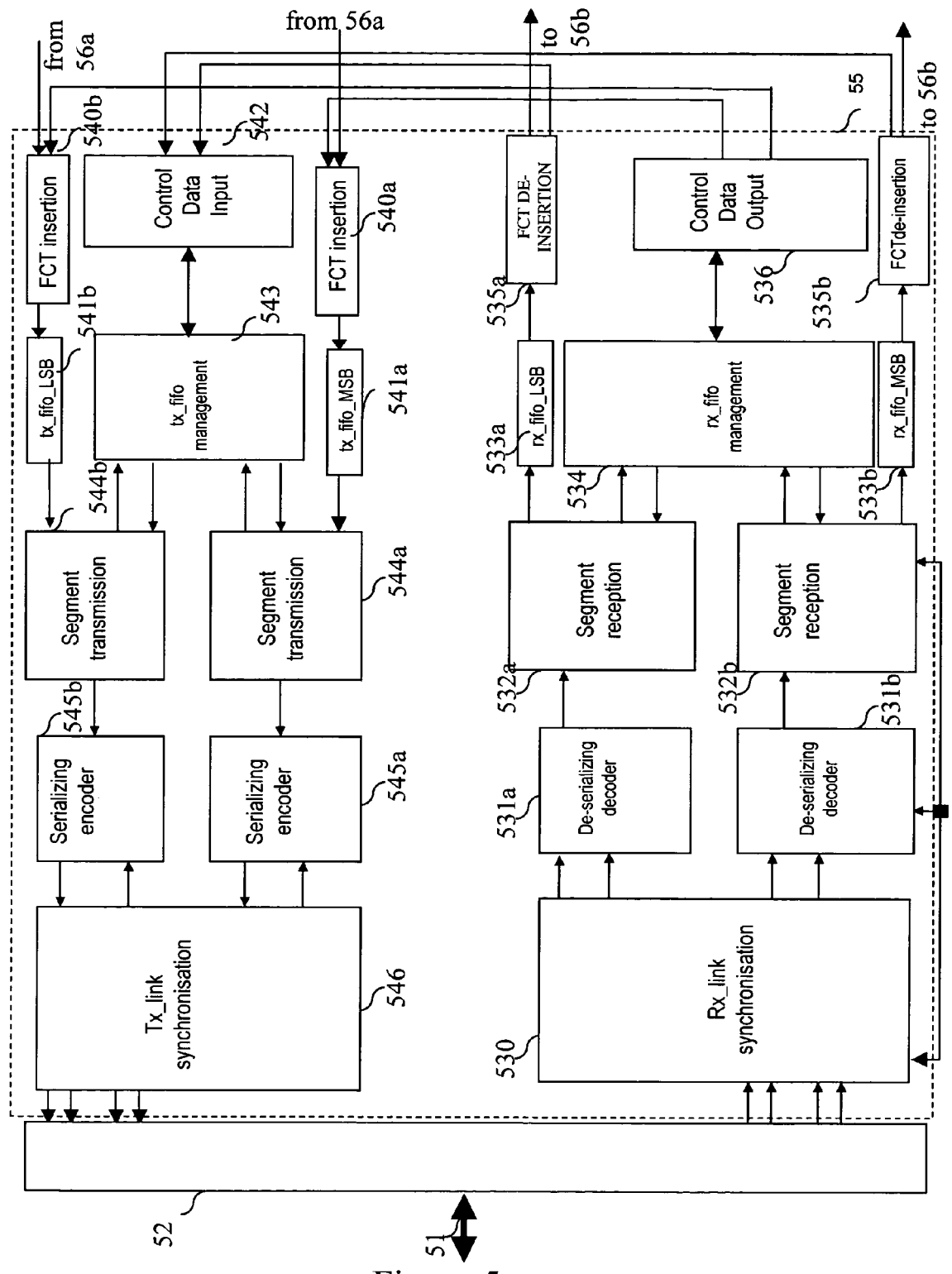
FIG. 5 is a block diagram of an interface for a system using coding and decoding algorithms illustrated in FIGS. 3A and 4A, according to a particular embodiment of the invention.

FIG. 5 is a synoptic view of a UTP5 type link interface for a system using the coding and decoding method described in FIGS. 3B and 4B, particularly within a communication network for connecting several items of equipment, for example in a home network.

The data transmission, which may be in different formats, is carried out in particular using adapted cables or links, particularly for applications in a home environment. Thus, the equipment processing digital data can operate according to standard IEEE-1394.

According to one particular embodiment, the data is transmitted using a CAT5 type cable composed of four twisted wire pairs, two pairs being designed to sending coded information and two pairs being designed for reception of information. This type of cable is conventionally used in Ethernet type networks and is particularly well adapted to the invention. Out of the two transmission pairs dedicated to sending (or reception), one pair transmits segments containing the most significant bits of information bytes sent by transmission devices, and the other pair transmits the segments containing the least significant bits of information bytes sent by sending devices.

The UTP5 link interface is connected to a transmission medium 51 as described previously.

Note that other wire media could be used such as cables complying with standard IEEE1355.

The link between the UTP5 link interface and the medium 51 is set up by means of a physical interface module 52, not described in this document.

This physical interface module 52 has a reception synchronisation block 530 connected to it that determines the binary value associated with each period of the signal received on a pair. It furthermore determines the start of the segment and informs the de-serialization/decoding block 531a and 531b of the binary value associated with each signal period received at the corresponding reception pair.

It must be noted that the data reaches the synchronisation block 530 in the form of two signals. Indeed, according to the invention, the data is divided into two: a first part for the most significant bits is received on one pair of wires and a second part for the least significant bits is received on another pair of wires.

Thus the synchronization block 530 gives each de-serialization/decoding block a synchronization clock signal determined from the signal received and thus determines the binary value of the signal for each of these periods.

The de-serialization/decoding blocks 531a and 531b will decode the data received using the decoding method presented in FIG. 4B, then will parallelise the data received, i.e. place each of them on eight bits.

When the data is decoded and parallelised, it is transferred to the segment reception blocks 532b for the segments containing the most significant bits and 532a for the segments containing the least significant bits.

These blocks 532a and 532b will rebuild the segments received and furthermore verify that the received segment is correct by carrying out, for example, a classic parity check on the received data.

When this check is made, the block 532b transfers the reconstructed most significant segment to a FIFO type storage means 533b. It also generates an information signal, intended for the FIFO control module 504, on the presence of a new segment.

The block 532a performs the same operations as the block 532b but does so for the segments containing the least significant bits. This block will not be described in greater detail.

The reception FIFO control module 534 informs the data output control module 536 about the reception of the totality of a segment, the segment comprising both least significant bytes stored in the FIFO 533a (rx_fifo_LSB) and most significant bytes stored in the FIFO 533b (rx_fifo_MSB).

There are three output memories connected through a bus 56a (MUX bus), and three input memories connected through a bus 56b (DEMUX Bus), associated with the UTP5 link interface. These memories are controlled by a FIFO control module. The data output control module 536 informs the FIFO control module of reception of a new segment.

The module 536 manages the insertion of the credit characters by the modules 540a and 540b as a function of the read operations on the storage means 533a and 533b.

The FIFO control module can then make a read request to read the data received through the modules for the analysis of the credits 535a and 535b.

The credit analysis modules 535a and 535b respectively extract, firstly, the information representing the FIFO memory or addressee buffer, secondly, the information representing a release of credit in a FIFO memory or remote reception buffer.

When the credit analysis modules 535a and 535b respectively identify an addressee buffer, the information is transmitted through a control signal to the FIFO control module so that this control module will select the input FIFO (3 output memories) to which the data will be transferred.

When the credit analysis modules 535a and 535b respectively identify a credit release, the information is transmitted through a control signal to the data-sending module 542.

The data-sending module 542, manages the method of segmentation for the transmission of the packets from each of the output FIFOs (3 output memories). The transfer of data from one of the output FIFOs firstly towards the FIFO for sending the most significant bytes 541a (tx_FIFO_MSB) and secondly to the FIFO for sending the least significant bytes 541b (tx_FIFO_LSB) is done through the credit insertion modules 540a for the least significant values and 540b for the most significant values.

Firstly, through control signals, the data-sending module 542 receives credit release information coming from the credit analysis module 535a and 535b respectively.

Secondly, the data-sending module 542 receives read requests from the output FIFOs coming from a FIFO control module.

Furthermore, the FIFO control module notifies the credit insertion module 540, when a predetermined number of pieces of data has been read in one of the input FIFOs. The credit insertion modules 540a and 540b respectively then insert a piece of information, into the segment, representing a release of credit associated with one of the input FIFOs.

The FIFO sending control module 543 notifies the data-sending 542 of the sending of the totality of a segment, the segment comprising both the least significant bytes stored in the FIFO 541b (tx_FIFO_LSB) and the most significant bytes stored in the FIFO 541a (tx_FIFO_MSB).

The blocks 544a and 544b will carry out the transmission of the segments by computing the parity control field associated with the segment. They therefore inform the FIFO sending control module 543 of the end of transmission of each part of the (respectively least significant and most significant) segment.

The blocks 545a and 545b will make byte-by-byte transmission of each segment in the form of a binary string through the sending synchronization block 546 as described in FIG. 3B. The sending synchronization block 546 is chiefly in charge of generating a synchronization signal at the head of a segment.

Figure 6A:
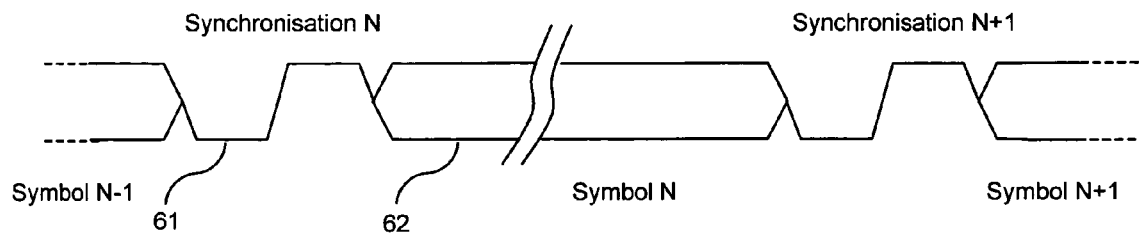
FIGS. 6A and 6B show a sequence of successive symbols coded according to the coder in FIG. 1.
Figure 6B:
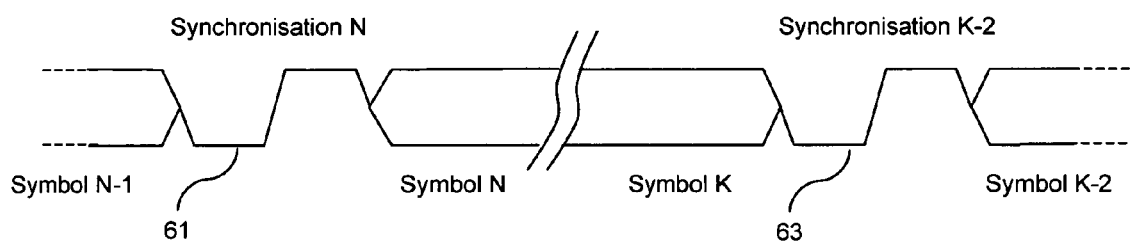

FIGS. 6A and 6B represent data transmitted during a serial transmission using the coding method described in FIG. 3B, these data comprising a sequence of successive symbols preceded by a synchronisation sequence.

FIG. 6A illustrates such a serial transmission in the case in which a synchronisation sequence 61 is added before each transmitted symbol 62.

When this sequence 61 is detected at the decoder/de-serialiser 531a and 531b, this decoder/de-serialiser decodes received symbols by performing a destretching operation of the coded bits without losing any data.

Thus synchronisation sequence 61 preferably respects the following characteristics:
  it is stretched (it does not comprise any isolated bit);
  its DC component is balanced (zero);
  it does not correspond to any word in the alphabet (illustrated in FIG. 7) determined by the coding method presented in FIG. 3B, to avoid confusing this synchronisation sequence with a coded word during decoding.

Thus, this synchronisation sequence 61 may for example be determined before coding, so as to respect the constraints mentioned above. This particular sequence, for example '0000011111', will be added before each coded symbol.

Obviously any sequence respecting the above mentioned characteristics will be accepted as a synchronisation sequence.

According to one variant of the invention, this sequence is not identical throughout the entire duration of the transmission and varies with each transmitted symbol (Synchro N−1, Synchro N, Synchro N+1, etc.).

According to another variant of the invention, the synchronisation sequence is transmitted regularly, for example every N symbols as described above, rather than before each symbol.

FIG. 6B illustrates a variant of the serial transmission presented in FIG. 6A. In this case, the synchronization sequence 61 is added to the data to be transmitted every time that a desynchronisation phenomenon appears.

In order to maximise the useful throughput and consequently to reduce costs, the synchronisation sequence 61 is added only when synchronisation is no longer achieved, rather than before each N symbol to be transmitted.

This sequence preferentially respects the same characteristics as mentioned above.

Thus, the synchronisation sequence N 61 is transmitted after the sent symbol N−1. If this sequence is received correctly and is recognised at the decoder, the decoder authorises the coder to stop transmitting the intermediate synchronisation sequence, for example using an acknowledgement protocol.

However, if the decoder encounters a synchronisation problem at a symbol K, the coder once again transmits the synchronisation sequence. Unrecognised symbols preceding the symbol K (for example symbols K−2 and K−1) are preferably managed by higher layers. The use of an "ARQ" (Automatic Repeat reQuest) type of error correction protocol enables correction of errors by retransmission of symbols contained in frames not correctly acknowledged.

This variant provides a means of optimising the useful speed during the transmission.

FIG. 7 shows a table presenting correspondence between words before coding and after coding, these words being coded using the coding method illustrated in FIG. 3B.

This table shows the correspondence (alphabet) between symbols inputting into the coder and symbols coded using the coding method illustrated in FIG. 3B at the output, and the correspondence between the symbols input into the decoder and symbols decoded using the decoding method illustrated in FIG. 4B at the output.

It thus enables the display of words prohibited for the synchronisation sequence. In this case, an attempt is made to code 8-bit words, namely bytes. Consequently, there are 256 different words (first column 71). Some of these bytes are shown before coding, in the second column 72. The '+' and '−' signs correspond to the two possible states of the binary elements that are to be coded. When coding bytes, the '+' sign may for example be associated with a bit with value '1' and the '−' sign may be associated with a bit with value '0'. According to one variant of the invention, these signs may for example correspond to '+1' or '−1' values, and more generally to two possible states of a binary element.

The different steps of the coding method described in FIG. 3A are presented in this table.

The third column 73 thus illustrates the data stretching operation: each group of consecutive '+' or '−' elements is extended by an element of the same value. Thus, the byte 76 composed of '++−+−−−−' elements becomes the stretched byte '+++−−++−−−−−' 77 after stretching of the data.

The fourth column 74 illustrates the disparity cancellation operation: balancing elements are added at the end of each stretched byte so as to obtain the same number of '+' elements as '−' elements. Thus, the stretched byte 77 composed of '+++−−++−−−−−' elements becomes the coded byte '+++−−++−−−−−++' 78 after adding balancing elements.

Finally, the fifth column 75 indicates the length of each word after coding. Thus, the average length of the code can then be calculated as being equal to 15.3125 bits.

Obviously, this invention is not limited to the embodiments described in detail here as examples, but can be extended to various modifications that can be made by those skilled in the art without departing from the scope of the invention.

Thus, a first variant can be used to transmit data for example using a radio-frequency transmission or an optical fibre, instead of a wire link.

A second variant embodiment consists of coding and transmitting elements that can be equal to more than two values, in other words non-binary elements.

The invention claimed is:

1. Coding method for a sequence of elements that can be equal to at least two distinct values, the elements forming at least one input symbol, the coding method comprising:
   a stretching step of stretching at least one of the input symbols to form a stretched symbol, such that the stretched symbol does not have any successive transitions; and
   a cancelling step of canceling a disparity of the stretched symbol, to form a coded symbol, such that the coded symbol comprises approximately a same number of elements of each value.

2. Coding method for a transmission of elements according to claim 1, wherein the coded symbol comprises exactly the same number of elements of each value.

3. Coding method according to claim 1, wherein said stretching step is performed by extending each group of consecutive elements with a same value by an additional element with the same value.

4. Coding method according to claim 1, wherein said cancelling step of cancelling the disparity of the stretched symbol includes the following steps:
   calculating the disparity of the stretched symbol; and
   adding balancing elements such that the disparity is cancelled in the corresponding coded symbol.

5. Coding method according to claim 4, wherein the stretched symbol comprises elements with a first value and elements with a second value, and said cancelling step of cancelling the disparity of the stretched symbol uses an intermediate step to stretch a last element of the stretched symbol when the number of the elements of the first value is more than the number of the elements of the second value by one unit, and when the last element of the stretched symbol is of the first value.

6. Coding method according to claim 1, wherein said stretching step is implemented for each of the input symbols.

7. Coding method according to claim 1, wherein said stretching step takes account of the value of a last element of the previous coded symbol so as to avoid two successive transitions.

8. Coding method according to claim 1, further comprising a scrambling step of scrambling the elements prior to said stretching step.

9. Coding method according to claim 1, wherein the sequence is to be used in a serial transmission.

10. Coding method according to claim 1, further comprising a step of adding a synchronization sequence to at least one of the coded symbols.

11. Coding method for transmission of a sequence of input data, the sequence of input data being comprised of elements that can be equal to at least two distinct values, the coding method comprising:
   a step of stretching the sequence of input data to form a stretched sequence, such that at least part of the stretched sequence does not have successive transitions; and
   a step of cancelling a disparity of the stretched sequence to form a coded sequence such that the coded sequence includes approximately a same number of elements of each value.

12. Method for decoding a sequence of elements that can be equal to at least two distinct values, the elements forming at least one coded symbol, the coded symbol not having any successive transitions and having approximately the same number of elements of each value, the decoding method comprising:
   a destretching step of destretching the coded symbol to form a destretched symbol; and
   an analyzing step of analyzing a disparity of the destretched symbol to form a decoded symbol.

13. Decoding method according to claim 12, the coded symbol including a first set of stretched elements, wherein said destretching step uses the following for the first set of stretched elements:
   a step of deleting a new received element when the previous element has a value different from the value of the new received element;
   a step of memorizing a new received element when the previous element has a value identical to the value of the new received element; and
   a step of updating a disparity, that depends on deleted and memorized elements.

14. Decoding method according to claim 13, the coded symbol also comprising a second set of balancing elements, wherein said analyzing step comprises:
   a step of analyzing the value of the updated disparity; and
   a step of processing the second set of balancing elements, when the value of the updated disparity is not equal to zero.

15. Decoding method according to claim 14, wherein said step for processing the second set of balancing elements uses the following, when the absolute value of the updated disparity is equal to one:
   a step of updating the disparity and deleting a new received element when the value of the previous element is identical to the value of the new element; and
   a step of notifying a transmission error and deleting a new received element when the value of the previous element is different from the value of the new element.

16. Decoding method according to claim 12, further comprising a step of taking account of the value of a last element of the previous decoded symbol.

17. Decoding method according to claim 12, further comprising an inverse scrambling step of the elements of the decoded symbols.

18. Decoding method according to claim 12, further comprising a step of recovering a synchronization sequence between at least two of the coded symbols.

19. Coding device for a transmission of a sequence of elements that can be equal to at least two distinct values, the elements forming at least one input symbol, the coding device comprising:

a stretching device configured to stretch at least one of the input symbols to form a stretched symbol, such that the stretched symbol does not have any successive transitions; and a cancelling device configured to cancel a disparity of the stretched symbol to form a coded symbol, such that the coded symbol comprises approximately a same number of elements of each value.

20. Device for decoding a sequence of elements that can be equal to at least two distinct values, the elements forming at least one coded symbol, wherein the coded symbol does not have any successive transitions and includes approximately the same number of elements of each value, the device comprising:

a receiving device configured to receive the coded symbol;

a decoding device configured to decode each of the coded symbols, the coded symbols being decoded separately;

a destretching device configured to destretch the coded symbol to form a destretched symbol; and an analyzing device configured to analyze a disparity of the destretched symbol to form a decoded symbol.

21. A computer program product adapted to the encoding of a sequence of elements that can be equal to at least two distinct values, the elements forming at least one input symbol, said computer program product comprising program code instructions recorded on a medium that can be used in a computer comprising:

programming means readable by computer to perform a stretching step of stretching at least one of the input symbols to form a stretched symbol, such that the stretched symbol does not have any successive transitions; and programming means readable by computer to perform a cancelling step of cancelling a disparity of the stretched symbol to form a coded symbol, such that the coded symbol comprises approximately a same number of elements of each value.

22. A computer program product adapted to the decoding of a sequence of elements that can be equal to at least two distinct values, the elements forming at least one coded symbol, the coded symbol not having any successive transitions and having approximately the same number of elements of each value, said computer program product comprising program code instructions recorded on a medium that can be used in a computer comprising:

programming means readable by computer to perform a destretching step of destretching the coded symbol to form a destretched symbol; and programming means readable by computer to perform an analyzing step of analyzing a disparity of the destretched symbol to form a decoded symbol.

23. A computer readable storage medium, which is totally or partially removable, storing a set of machine executable instructions, said instructions being executable by a computer adapted to the encoding of a sequence of elements that can be equal to at least two distinct values, the elements forming at least one input symbol, to perform:

a stretching step of stretching at least one of the input symbols to form a stretched symbol, such that the stretched symbol does not have any successive transitions; and a cancelling step of cancelling a disparity of the stretched symbol to form a coded symbol, such that the coded symbol comprises approximately a same number of elements of each value.

24. A computer readable storage medium, which is totally or partially removable, storing a set of machine executable instructions, said instructions being executable by a computer adapted to decoding a sequence of elements that can be equal to at least two distinct values, the elements forming at least one coded symbol, the coded symbol not having any successive transitions and having approximately the same number of elements of each value, to perform:

a destretching step of destretching the coded symbol to form a destretched symbol; and an analyzing step of analyzing a disparity of the destretched symbol to form a decoded symbol.

* * * * *